United States Patent [19]

Nishizawa et al.

[11] Patent Number: 4,836,262

[45] Date of Patent: Jun. 6, 1989

[54] METAL CORDS AND PNEUMATIC TIRES USING THE SAME

[75] Inventors: Kuninori Nishizawa, Higashiyamato City; Teruo Miura, Akigawa City; Yoichi Watanabe, Kodaira City; Hirohiko Takagi, Higashiyamato City, all of Japan

[73] Assignee: Bridgestone Corporation, Tokyo, Japan

[21] Appl. No.: 59,983

[22] Filed: Jun. 9, 1987

[30] Foreign Application Priority Data

Aug. 8, 1986 [JP] Japan .................................. 61-185261
Nov. 25, 1986 [JP] Japan .................................. 61-278790
Dec. 18, 1986 [JP] Japan .................................. 61-303503

[51] Int. Cl.$^4$ ...................... D02G 03/48; B60C 09/18
[52] U.S. Cl. ...................................... 152/451; 57/212; 57/902; 152/527
[58] Field of Search ................ 152/451, 527, 548, 556, 152/538, 537, 536; 57/210, 212, 237, 902; 148/12 B

[56] References Cited

U.S. PATENT DOCUMENTS

| | | | |
|---|---|---|---|
| 3,598,165 | 8/1971 | Hanus | 152/536 X |
| 4,020,887 | 5/1977 | Vlasov et al. | 152/451 |
| 4,047,552 | 9/1977 | Maeda et al. | 152/537 X |
| 4,333,306 | 6/1982 | Yamashita et al. | 57/216 X |
| 4,399,853 | 8/1983 | Morimoto et al. | 152/451 |
| 4,464,892 | 8/1984 | Kleijwegt | 57/212 |
| 4,506,500 | 3/1985 | Miyauchi et al. | 57/902 |
| 4,738,096 | 4/1988 | Hatakeyama et al. | 152/527 X |

FOREIGN PATENT DOCUMENTS 56-43008  4/1981  Japan .................................. 152/451

Primary Examiner—Michael W. Ball
Assistant Examiner—Ramon R. Hoch
Attorney, Agent, or Firm—Sughrue, Mion, Zinn, Macpeak & Seas

[57] ABSTRACT

A metal cord is constructed by twisting three metal filaments in the same direction, and satisfies Lmax ≧ 1.05d, Lmin ≧ 1d and Lmax/Lmin ≧ 1.05 (Lmax : center distance between longest separated metal filaments, Lmin : center distance between shortest separated metal filaments, d : diameter of metal filament), and has specified twisting pitch and elongation under a load of 5 kg/cord. A pneumatic tire comprises a belt composed of plural belt layers each containing the above metal cords arranged at a given inclination angle with respect to the circumferential direction of the tire.

17 Claims, 4 Drawing Sheets

FIG_1
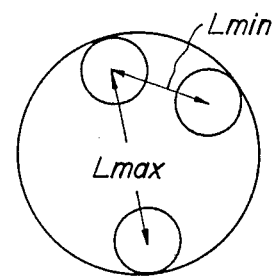
FIG_2a
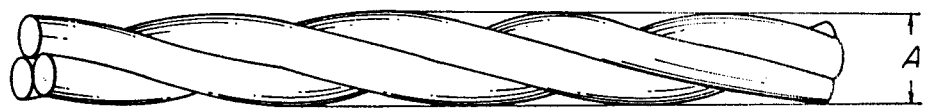
FIG_2b
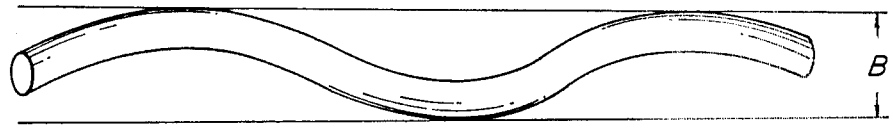

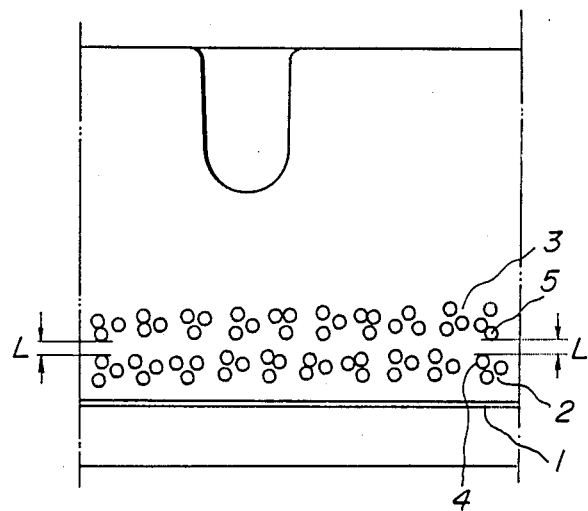
FIG_5
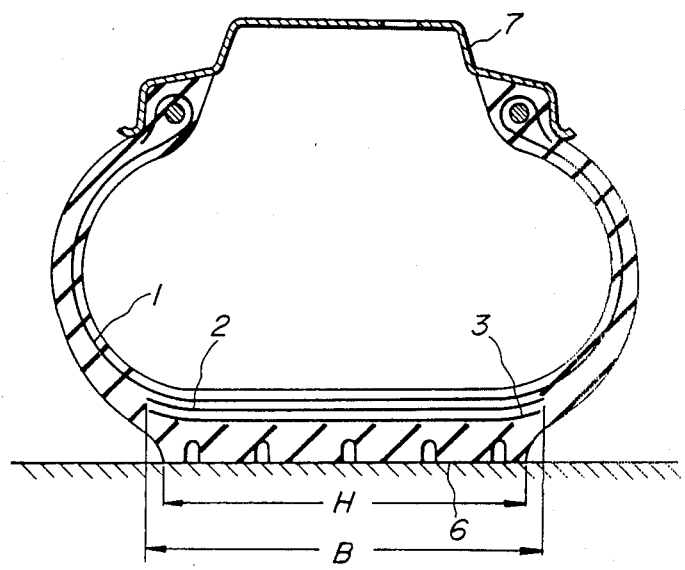
FIG_6

FIG_7
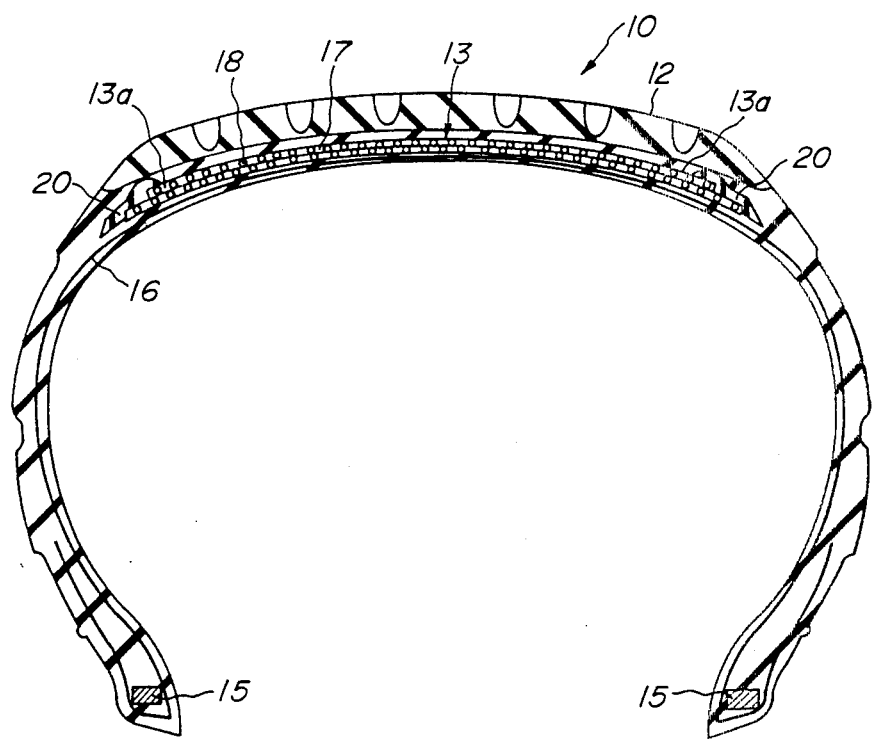
FIG_8
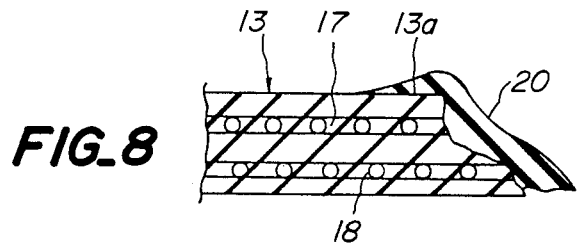

METAL CORDS AND PNEUMATIC TIRES USING THE SAME

BACKGROUND OF THE INVENTION

1. Field of the Invention

This invention relates to an improvement of metal cords used as a reinforcing member in rubber articles, particularly a belt of a pneumatic tire which can simultaneously establish resistance to cord breaking and weight-saving. Further, it relates to pneumatic tires having improved rolling resistance and service durability by using such metal cords.

2. Related Art Statement

In conventional rubber articles, particularly pneumatic tires, metal cords are widely used as a reinforcing member. For instance, the metal cord of a so-called 1×4 or 1×5 structure obtained by twisting 4 or 5 metallic filaments is used as a reinforcing member in a belt of a radial tire for a passenger car.

In using the metal cord as a reinforcing member, it is important that the metal cords are properly embedded in a coating rubber and sufficiently bonded thereto. If the coating rubber does not sufficiently penetrate into the inside of the metal cord or the bonding state between the metal cord and the coating rubber is poor, the metal filaments constituting the metal cord are corroded by water contained in the coating rubber or penetrated from the outside and the like to undesirably cause the breaking of the metal filament or separation failure between cord and rubber.

In order to solve these problems, there have hitherto been examined various methods. In U.S. Pat. No. 4,399,853 is disclosed a metal cord having such an irregular section distribution in longitudinal direction inclusive of separation regions between mutual filaments at an inequal interval as well as local contact regions separated between at least one adjoining mutual filaments but contacted between the remaining mutual filaments. In U.S. Pat. No. 4,333,306 is disclosed a steel cord having such a twisting structure that the loose twisted portion and the compact twisted portion are alternately arranged with each other in the longitudinal direction of the cord.

On the other hand, the weight-saving of the pneumatic tire is demanded from viewpoints of the improvement of rolling resistance in the pneumatic tire and resource-saving. In this connection, it has been attempted to simplify the twisting structure of the metal cord used as a reinforcement for thinning the thickness of the reinforcing layer in the pneumatic tire. For instance, U.S. Pat. No. 4,464,892 discloses a metal cord comprised of three metal filaments as a reinforcement in an elastic article such as pneumatic tire or the like, wherein the two metal filaments are twisted in a given direction to form a strand and the remaining metal filament is spirally arranged around the strand in a direction opposite to the twisting direction of the strand.

In any case, however, the improvement of the metal cord is attempted from only a viewpoint of the cord structure, and it is not attempted to synthetically solve the problems of the filament breaking in the metal cord and the separation between cord and rubber from viewpoints of the structure and shape of the reinforcing belt layer.

In the metal cord disclosed in U.S. Pat. No. 4,464,892, it is intended to penetrate the coating rubber between the strand composed of two metal filaments and the twisted metal filament. In this case, however, the twisting operation should be repeated two times, so that the production cost becomes expensive and also the compressive fatigue properties of the cord is poor.

When the twisted filament number is three, if the twisting is carried out so as to alternately arrange the loose twisted portion and the compact twisted portion per cycle as described in U.S. Pat. No. 4,333,306, the loose twisted portion is compacted under a tension, so that when the cord is used as a reinforcement for the pneumatic tire, it is difficult to penetrate the coating rubber into the interior of the cord.

In order to overcome the aforementioned problems and provide a metal cord with a twisting number of 3 facilitating the penetration of the coating rubber therein to, the metal cord disclosed in U.S. Pat. No. 4,399,853 is considered to effectively change so as to further facilitate the penetration of the coating rubber.

Further, in case of enhancing the resistance to cord breaking and the resistance to separation between cord and rubber in the cord reinforcing layer of the belt, it is demanded that not only the metal cord is improved, but also the improved metal cord is advantageously applied to the pneumatic tire. However, such a demand is not yet satisfied.

SUMMARY OF THE INVENTION

It is, therefore, an object of the invention to provide novel metal cords which improve the resistance to cord breaking and the separation resistance by limiting the number of metal filaments constituting the cord to three and improving the penetration of the coating rubber into the cord to hardly cause the corrosion.

It is another object of the invention to advantageously apply the above novel metal cord to a belt of a pneumatic tire to reduce the rolling resistance of the tire based on the weight-saving of the tire and to largely improve the service durability of the tire.

According to a first aspect of the invention, there is the provision of a metal cord constructed by twisting three metal filaments having the same filament diameter d in the same direction, said cord satisfying $Lmax \geq 1.05d$, $Lmin \geq 1d$ and $Lmax/Lmin \geq 1.05$, wherein Lmax is a center distance between the longest separated metal filaments and Lmin is a center distance between the shortest separated metal filaments, and having a twisting pitch of 6.5–20 mm and an elongation of 0.2–1.2% under a load of 5.0 kg per cord.

According to a second aspect of the invention, there is the provision of a pneumatic tire comprising a carcass ply of substantially radial structure and a belt superimposed about a crown portion of the carcass ply and composed of plural metal cord layers each containing metal cords therein; said metal cord being constructed by twisting three metal filaments having the same diameter d in the same direction and satisfying $Lmax \geq 1.05d$, $Lmin \geq 1d$ and $Lmax/Lmin \geq 1.05$, wherein Lmax is a center distance between the longest separated metal filaments and Lmin is a center distance between the shortest separated metal filaments, and having a twisting pitch of 6.5–20 mm and an elongation of 0.2–1.2% under a load of 5 kg per cord; said metal cords being arranged at an inclination angle of 17°–25° with respect to the circumferential direction of the tire in such a manner that a shortest vertical distance (L) between the most adjacent metal filaments in the opposed metal cords between the adjoining metal cord layers is within a range of 0.5–1.3 mm; and said tire having a ratio of belt width (B) to ground contact width of tread (H) of not more than 1.2.

In a preferred embodiment of the invention, the coating rubber used in the metal cord layer has a modulus of elasticity of 10–30 kg/cm$^2$ under 50% elongation after vulcanization.

In another preferred embodiment of the invention, each end portion of the belt is covered with an auxiliary rubber layer composed of a rubber composition containing 1–5 parts by weight of an epoxy resin incompatible with rubber component based on 100 parts by weight of rubber component.

BRIEF DESCRIPTION OF THE DRAWINGS

The invention will be described with reference to the accompanying drawings, wherein:

FIG. 1 is a diagrammatic view showing a relation between Lmax and Lmin in the metal cord according to the invention;

FIGS. 2a and 2b are schematic views illustrating maximum diameter A at twisted state and maximum amplitude B at untwisted state in the metal filament;

FIG. 5 is a partially radial section view showing a state of metal cords according to the invention embedded in a tire crown portion;

FIG. 6 is a radial section view of an embodiment of the pneumatic tire according to the invention showing a relation between belt width (B) and ground contact width (H); —

FIG. 7 is a radial section view of a second embodiment of the pneumatic tire according to the invention; and FIG. 8 is a partial enlarged section view of a main part of the pneumatic tire of FIG. 7.

DESCRIPTION OF THE PREFERRED EMBODIMENTS

Figure 3:
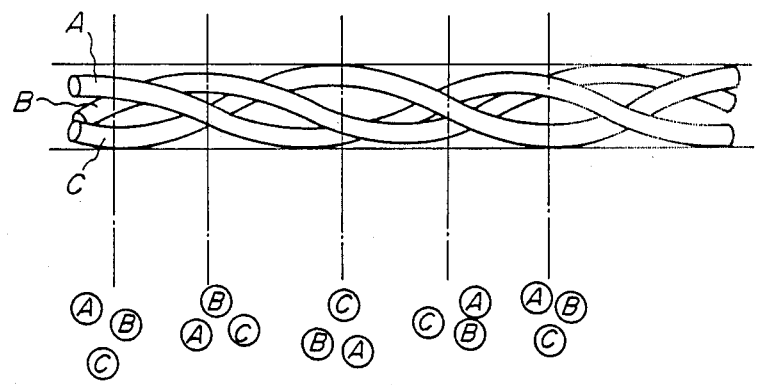
FIGS. 3 and 4 are schematic views showing longitudinal shapes of various embodiments of the metal cord according to the invention and diagrammatically section views at predetermined cutting positions thereof, respectively.

In the metal cord according to the invention, when Lmax is less than 1.05, the penetration of the coating rubber rapidly lowers. The relation between Lmax and Lmin is shown in FIG. 1.

As Lmax becomes larger, the penetrability of the coating rubber is advantageously improved. However, when Lmax exceeds 3.0d or Lmax/Lmin exceeds 3.0, the twisting disorder of the cord is apt to be caused to thereby make the drawing set of metal filaments poor, and also the strength of the cord lowers.

Particularly, when the region corresponding to Lmax of not less than 1.5d is existent in an amount of not less than 30%, preferably not less than 50%, more particularly 50–95% in an optional range in longitudinal direction of the metal cord corresponding to a length of 50 mm, the penetrability of the coating rubber as well as the resistance to cord breaking and the resistance to separation between cord and rubber are considerably improved.

The reason why the elongation (P) under a load of 5 kg per cord is limited to a range of 0.2–1.2% is due to the fact that when the elongation is less than 0.2%, the penetrability of the coating rubber is low, while when it exceeds 1.2%, the twisting disorder is apt to be caused at the cut end portion of the cord and it is difficult to control the tension of the cord in the calendering of the cord and rubber from a viewpoint of the operability. The elongation of P=0.4–0.8% is more preferably in view of the rubber penetrability an operability.

Further, the reason why the twisting pitch of the metal cord is restricted to a range of 6.5–20 mm is due to the fact that when the twisting pitch is less than 6.5 mm, not only does productivity lowers but also the penetrability of the coating rubber into the cord degrades, while when it exceeds 20 mm, the resistance to cord breaking is largely degraded by buckling fatigue of the cord.

According to the invention, the diameter of the metal filament constituting the metal cord is properly set in accordance with the intended use. When the metal cord is used as a reinforcement for the belt in pneumatic radial tires for passenger cars, the diameter d of the metal filament is preferably 0.12–0.40 mm, while when it is used in a carcass ply of a low-section profile radial tire for heavy vehicles, the diameter d of the metal filament is preferably 0.15–0.30 mm. In any case, it is preferable that the diameter of the metal filament is 0.15–0.40 mm in case of applying to pneumatic radial tires.

In the radial tire for passenger car, when the filament diameter d in the cord as a reinforcement for the belt is less than 0.12 mm, the strength of the cord is too small. On the other hand, when the filament diameter d in the cord as a carcass ply of the low-section profile radial tire for heavy vehicle is less than 1.5 mm, it is difficult to obtain a single carcass ply.

When the filament diameter d in case of the radial tire for passenger car exceeds 0.4 mm, or when the filament diameter d in case of the heavy duty low-section profile radial tire exceeds 0.30 mm, not only do the fatigue properties of the cord lower, but also the tire weight becomes heavier and the productivity considerably lowers.

In the metal cord according to the invention, the kind of the material is not restricted, but the use of steel cord is preferable because it is easily available and inexpensive. In the latter case, the surface of the steel filament may be covered by a metal selected from Cu, Sn, Zn and the like or an alloy of the metal with Ni or Co in order to enhance the adhesion to rubber.

Moreover, the metal cord according to the invention may be produced as follows. That is, three metal filaments, which are previously shaped at an excessive forming ratio by means of a preformer, are twisted to form a metal cord. After the twisting, the cord may be compressed in the radial direction of the cord through rollers or the like so as to provide a predetermined elongation P under a load of 5 kg/cord, if necessary.

As shown in FIGS. 2a and 2b, assuming that the maximum diameter of the cord at a state of completely contacting the metal filaments with each other or a so-called closed state is A and the maximum amplitude of the metal filament at a disassembled state is B, the forming ratio is represented by B/A×100(%). The wordings "excessive forming" means that the forming ratio exceeds 100%. As the forming ratio becomes larger than 100%, the metal cord takes a so-called open structure and consequently the coating rubber is easy to penetrate into the cord. The forming ratio is preferably 120–200% from viewpoint of rubber penetrability, cord strength and operability in tire production. In fact, it is favorable to make the forming ratio to about 150% in order to obtain the rubber penetrability of 100%.

When the forming ratio exceeds 300%, twisting disorder is apt to be caused and also the thickness of the coating rubber becomes thicker to increase the weight of the tire. Therefore, care should be taken that the forming ratio does not exceed 300%. That is, it is preferable that the forming ratio of the metal filament is 100–200%.

Although the forming ratios of the metal filaments constituting the metal cord are not necessarily the same, if the forming ratios in these metal filaments are largely different, the strength of the metal filament used in the cord unfavorably lowers. On the other hand, when the forming ratio is less than 100%, the structure of the cord is changed into a closed state, and consequently the coating rubber does not penetrate into the cord.

In order to make Lmax large, not only is the forming ratio of each of the metal filaments made large, but also the forming ratio of only one of the filaments or the phase of the forming ratio may be varied.

In the metal cord according to the invention, the coating rubber penetrates well into the inside of the cord, so that the corrosion resistance is largely improved. As a result, high tensile strength steel wires, whose corrosion fatigue properties have hitherto been said to be slightly poor, can be used as a metal filament. In case of using such a steel wire, the filament diameter may be made small, so that when the cord using the steel wire is used as a reinforcement for pneumatic radial tire, the weight-saving of the tire and the reduction of the rolling resistance can further be achieved. In order to provide the high tensile strength steel wire, the carbon content of the steel wire is made large, or the reduction rate is made large in the drawing of the steel wire. The steel filament used in the production of the metal cord according to the invention is preferable to have a carbon content of 0.75–0.85% by weight and a tensile strength of not less than 280 kg/mm$^2$.

When the carbon content is less than 0.75% by weight, or when the tensile strength is less than 280 kg/mm$^2$, the effect of reducing the diameter of the steel filament is not substantially obtained, while when the carbon content exceeds 0.85% by weight, the cord breaking is apt to be caused in the production of the cord.

The metal cords according to the invention may be produced by using a tubular type or puncher type twisting machine.

Figure 4:
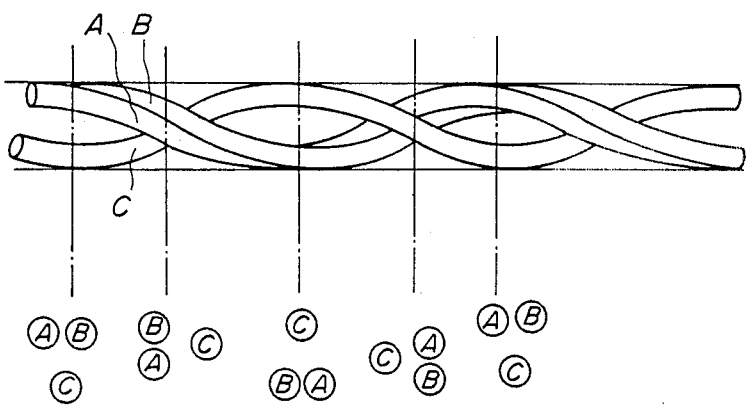

A concrete embodiment of the metal cord according to the invention will be described with reference to FIGS. 3 and 4. The metal cord shown in FIG. 3 is constructed by twisting two metal filaments A and B each having a forming ratio of 110% and a metal filament C having a forming ratio of 150% while shifting only the phase of the metal filament A. The metal cord shown in FIG. 4 is constructed by twisting three metal filaments A, B and C each having a forming ratio of 105% while shifting the phases of the metal filaments A and B together.

In the pneumatic tire according to the invention, it is important to reduce the buckling strain and interlaminar strain in the metal cords embedded in the coating rubber in order to develop the properties of the metal cord having the aforementioned simplified twisting structure at maximum when the cord is used in the belt of the tire, i.e. in order to improve the resistance to belt breaking and the resistance to belt end separation to thereby largely enhance the service durability of the tire.

For this purpose, the metal cords are arranged at an inclination angle of 17°–25° with respect to the circumferential direction of the tire. When the inclination angle is less than 17°, the buckling strain undesirably increases, while when it exceeds 25°, the cornering force and cornering power become small to degrade not only the cornering stability but also the rolling resistance.

The shortest vertical distance (L) between the most adjacent metal filaments in the opposed metal cords between the adjoining metal cord layers in the belt will be described with reference to FIGS. 5 and 6.

As shown in FIG. 5, the shortest vertical distance L is a vertical component of distance between most adjacent metal filaments 4 and 5 in the opposite metal cords in the belt superimposed about the crown portion of the carcass ply 1 and composed of two belt layers, i.e. inner belt layer 2 and outer belt layer 3. Moreover, numeral 6 is a ground contact surface, and numeral 7 is a wheel rim.

When the shortest vertical distance (L) is less than 0.5 mm, the buckling strain and interlaminar strain of the metal cord increase. While when it exceeds 1.3 mm, the volume of rubber undesirably increases to degrade the rolling resistance, and also the cornering force and cornering power lower to degrade the cornering stability.

From a viewpoint of tire shape as shown in FIG. 6, it is necessary that a ratio of belt width (B) to tread ground contact width (H) is not more than 1.2.

When the ratio (B/H) exceeds 1.2, the buckling strain increases to easily cause the breaking of the metal cord, and the movement of the belt end becomes large to degrade the resistance to separation failure at belt end. Preferably, the ratio B/H is within a range of 0.9–1.1. When B/H is less than 0.9, the resistance to belt breaking and resistance to belt end separation are improved, but the uneven wear is apt to be caused at the belt end. The belt width (B) is a length of a belt layer having a maximum width among the belt layers as measured in the axial direction of the tire, and is a widthwise length of the inner belt layer 2 in the embodiment of FIG. 6. On the other hand, the tread ground contact width (H) is a length of a tread ground contact surface 6 under normal internal pressure and normal load (100%) according to TRA standard in the axial direction of the tire.

In the pneumatic tire according to the invention, it is preferable that the coating rubber embedding the metal cords therein has a modulus of elasticity of 10–30 kg/cm$^2$ at 50% elongation after vulcanization. When the modulus of elasticity is outside the above range, the bending deformation of the belt layer in the radial and circumferential directions of the tire is not smooth, and local buckling deformation is apt to be caused.

Furthermore, in order to reduce the peeling between the belt layers at their end portions, the auxiliary rubber layer is disposed on each end portion of the belt so as to cover each end portions of the belt layers, whereby the stress concentration at each end portion of the belt is mitigated to largely enhance the tear strength. The auxiliary rubber layer is comprised of a rubber composition comprising 1–5 parts by weight of an epoxy resin incompatible with rubber component based on 100 parts by weight of rubber component and has a thickness of 0.5–2 mm.

When the content of epoxy resin is less than 1 part by weight, the effect of preventing the peeling at both end portions of the belt layers is small, while when it exceeds 5 parts by weight, the internal loss of the rubber composition becomes larger to raise the heat generating temperature and consequently the rubber layer is apt to be broken to lead the degradation of the tire durability.

As the epoxy resin, use may be made of any epoxy resins incompatible with rubber, but it is preferable to use an epoxy resin having an epoxy equivalent of 100-200. In general, the cut surfaces of the steel cords located in the both ends of the belt layer are not covered with the coating rubber for the belt, so that the adhesion to the surrounding rubber becomes poor. However, such a poor adhesion is solved by covering the end portions of the belt layers with the auxiliary rubber layer containing the epoxy resin with an epoxy equivalent of 100-200.

Moreover, it is desirable that the auxiliary rubber layer has a modulus of elasticity of 10-30 kg/cm$^2$ at 50% elongation after vulcanization likewise the coating rubber, because the local buckling deformation is apt to be caused when the modulus of elasticity in the auxiliary rubber layer is outside the above range. In particular, when the modulus of elasticity is less than 10 kg/cm$^2$, the rigidity of the belt layer lowers and also the cornering performance of the tire largely lowers. Therefore, it is preferable that the modulus of elasticity in the auxiliary rubber layer is substantially equal to that of the coating rubber.

Thus, the microstress concentration of rubber can be mitigated by finely and ununiformly dispersing the epoxy resin into rubber in the auxiliary rubber layer, whereby the tear strength can be enhanced and hence the belt end separation ca be reduced.

The following examples are given in the illustration of the invention and are not intended as limitations thereof.

EXAMPLE 1

Eleven kinds of steel cords with 1×3 structure were prepared by twisting three steel filaments each subjected to a brass plating and having a carbon content of 0.82%, a tensile strength of 295 kg/mm$^2$ and a diameter of 0.3 mm, provided that the forming ratio of each filament in the steel cord was varied as shown in the following Table 1. The steel cords of Run Nos. 8 and 9 in Table 1 corresponded to those of FIGS. 3 and 4, respectively.

In all of the steel cords, the steel filaments were twisted by means of a tubular type twisting machine.

After twisting, the elongation P of each of the steel cords other than the steel cords of Run No. 11 was adjusted to a given value through rollers.

These steel cords were used in an outer belt layer among two belt layers constituting a belt of a radial tire for passenger car with a tire size of 175 SR 14, and embedded in a coating rubber having a modulus of elasticity at 50% elongation of 25 kg/cm$^2$. In this test tire, the outer belt layer was divided into eleven equal parts in the circumferential direction of the tire, to which parts were applied the above eleven kinds of steel cords, respectively, for providing the same experimental conditions on these steel cords.

After the steel cord was sampled out from the test tire, a length of a portion that rubber substantially penetrated into the inside of the steel cord was measured. The rubber penetration degree was represented by a ratio of rubber penetrated length to entire cord length (%).

After a hole of 3 mm in diameter was pierced in the ground contact area of the test tire at a position corresponding to each of the above eleven kinds of the steel cords so as to arrive at the steel cord, the test tire was run on an outdoor drum tester at a speed of 90 km/hr under JIS normal internal pressure and JIS normal load over a distance of 50,000 km while scattering water. Then, the steel cord was taken out from the belt layer at a position corresponding to the hole, and the peeling length at adhesion interface between cord and coating rubber was measured, which was evaluated as a length of corroded cord (mm).

Each of eleven kinds of steel cords was embedded in a resin and cut at an interval of 2 mm over the embedded cord length of 50 mm. After polishing, 26 cut surfaces were photographed at the same magnification through a microscope, from which Lmax and Lmin were determined.

Here, the elongation P was an elongation (%) when a load of 5 kg was applied to the steel cord of 20 cm in length, and S(%) was a ratio of region having Lmax of not less than 1.5d at an optional position corresponding to a length of 50 mm in the longitudinal direction of the steel cord. S(%) was determined in the same manner as in Lmax and Lmin.

TABLE 1

| Run No. | Lmax | Lmax/Lmin | P (%) | Twisting pitch | S (%) | Forming ratio (%) | Rubber penetration degree (%) | Length of corroded cord (mm) |
|---|---|---|---|---|---|---|---|---|
| 1 (comparative) | 1.00~1.03d | 1.00~1.01 | 0.1 | 9.5 | 0 | 100 | 0 | 100 |
| 2 | 1.05d~1.55d | 1.05d~1.07 | 0.26 | 9.5 | 8 | 110 | 15 | 80 |
| 3 | 1.06d~1.62d | 1.05~1.25 | 0.30 | 9.5 | 17 | 115 | 48 | 55 |
| 4 | 1.06d~1.70d | 1.05~1.34 | 0.34 | 9.5 | 28 | 120 | 80 | 5 |
| 5 | 1.10d~1.92d | 1.06~1.55 | 0.45 | 9.5 | 50 | 150 | 100 | 4 |
| 6 | 1.20d~2.14d | 1.06~1.67 | 0.72 | 9.5 | 65 | 170 | 100 | 4 |
| 7 | 1.23d~2.25d | 1.05~1.83 | 0.95 | 9.5 | 72 | 200 | 100 | 4 |
| 8 | 1.13d~1.95d | 1.16~1.65 | 0.65 | 14.0 | 51 | 110 (Two filaments) 150 (One filament) | 100 | 4 |
| 9 | 1.15d~1.90d | 1.20~1.75 | 0.76 | 14.0 | 45 | 150 | 100 | 3 |
| 10 | 1.13d~2.02d | 1.07~1.56 | 0.88 | 14.0 | 54 | 170 | 95 | 4 |
| 11 (comparative) | 1.28d~2.45d | 1.06~1.65 | 1.40 | 14.0 | 78 | 300 | 100 | 3 |

In the steel cords of Run Nos. 2-10, the corrosion resistance is considerably improved. Particularly, the calendering operability is good in Run Nos. 2-6 and 8-10. On the other hand, the operability in Run No. 11 is poor because the twisting disorder of the steel cords is large at the cut end portion of the rubber sheet containing the cords therein after calendering.

EXAMPLE 2

Twelve pneumatic radial tires with a tire size of 185 SR 14 were provided as Run Nos. 12-23. The steel cord of Run No. 7 was applied to each tire of Run Nos. 12-15, while the steel cord of Run No. 10 was applied to each tire of Run Nos. 16-23. In these tires, the steel cords were embedded at an end count of 38 cords/5 cm in each of two belt layers in such a manner that the inclination angle of the steel cord with respect to the circumferential direction of the tire was 20° in case of Run Nos. 12-21, 15° in case of Run No. 22 and 27° in case of Run No. 23, provided that the steel cords of the two belt layers were crossed with each other. Each of these tires had a shortest vertical distance (L) between the most adjacent steel filaments in the opposite steel cords between the adjoining two belt layers and a ratio (B/H) of belt width (B) to tread ground contact width (H) as shown in the following Table 2.

The resistance to cord breaking, resistance to belt end separation, rolling resistance and cornering power were evaluated with respect to these twelve pneumatic radial tires.

As regards resistance to cord breaking, the tire was subjected to a drum test, wherein the tire was run on a drum at a speed of 15 km/hr under an internal pressure of 1.0 kg/cm² and a load corresponding to 120% of service load (JIS 100% load) while applying a constant side force in a direction acting compression force to the inner belt layer. After the running of 15 hours, the number of broken cords was measured. The resistance to cord breaking was represented by an index as a reciprocal of the broken cord number on the basis that the tire of Run No. 12 was 100. The larger the index value, the better the resistance to cord breaking.

After the completion of the above drum test, the belt end portion was exposed by cutting to measure the length of crack grown from the belt end. The resistance to belt end separation was represented by an index as a reciprocal of the grown crack length on the basis that the tire of Run No. 12 was 100. The larger the index value, the better the resistance to belt end separation.

The rolling resistance and cornering power were evaluated by the usual drum test method, and represented by an index on the basis that the tire of Run No. 12 was 100, respectively. The larger the index value, the better the rolling resistance and cornering power.

In Table 2, Run Nos. 12, 13, 17 and 18 correspond to the tires according to the invention.

TABLE 2

| | | Run No. | | | | | |
|---|---|---|---|---|---|---|---|
| | | 12 | 13 | 14 | 15 | 16 | 17 |
| L (mm) (average value) | | 0.3~0.6 (0.42) | 0.8~1.1 (0.92) | 0.8~1.1 (0.95) | 1.4~1.7 (1.58) | 0.3~0.6 (0.38) | 0.8~1.0 (0.97) |
| B/H | | 1.04 | 0.98 | 1.08 | 1.08 | 1.04 | 0.98 |
| Tire performances | resistance to cord breaking | 100 | 175 | 160 | 185 | 100 | 180 |
| | resistance to belt end separation | 100 | 180 | 168 | 207 | 100 | 178 |
| | Rolling resistance | 100 | 100 | 98 | 94 | 100 | 100 |
| | Cornering power | 100 | 100 | 105 | 90 | 100 | 100 |

| | | Run No. | | | | | |
|---|---|---|---|---|---|---|---|
| | | 18 | 19 | 20 | 21 | 22 | 23 |
| L (mm) (average value) | | 0.8~1.1 (1.02) | 1.4~1.7 (1.53) | 0.8~1.0 (0.97) | 1.4~1.7 (1.53) | 0.8~1.0 (0.97) | 0.8~1.0 (0.97) |
| B/H | | 1.08 | 1.08 | 1.24 | 1.24 | 0.98 | 0.98 |
| Tire performances | resistance to cord breaking | 164 | 192 | 93 | 132 | 118 | 203 |
| | resistance to belt end separation | 170 | 195 | 108 | 135 | 165 | 192 |
| | Rolling resistance | 97 | 94 | 91 | 87 | 96 | 97 |
| | Cornering power | 105 | 89 | 110 | 92 | 97 | 88 |

As seen from Table 2, in the tires of Run Nos. 13, 14, 17 and 18, the resistance to cord breaking and resistance to belt end separation are considerably improved without degrading the rolling resistance and cornering power.

EXAMPLE 3

In this example, there was provided a pneumatic radial tire having a tire size of 165 SR 13 as shown in FIGS. 7 and 8.

The pneumatic radial tire 10 comprised a tread extending in the circumferential direction of the tire, a belt 13 extending radially inside the tread 13 and composed of two belt layers, and a carcass 16 located inside the belt 13 and extending between a pair of beads 15. Each of the two belt layers 13 was constructed by embedding steel cords 18 of Run No. 8 in a coating rubber 17. Further, each widthwise end portion 13a of the belt 13 was covered with an auxiliary rubber layer 20 as shown in FIG. 8.

The coating rubber 17 and the auxiliary rubber layer 20 were made from a rubber composition having a compounding recipe as shown in the following Table 3, respectively.

TABLE 3

| Kind of rubber composition | Coating rubber for belt | | | Auxiliary rubber layer | | |
|---|---|---|---|---|---|---|
| | A | B | C | E | F | G |
| Natural rubber | 100 | 100 | 100 | 100 | 100 | 100 |
| Carbon black HAF | 55 | 45 | 60 | 55 | 55 | 60 |
| Antioxidant*[1] | 1 | 1 | 1 | 1 | 1 | 1 |
| Aromatic oil | 0 | 10 | 0 | 0 | 0 | 0 |
| Stearic acid | 0 | 0 | 0 | 2 | 2 | 2 |
| Cobalt naphthenate | 3 | 3 | 3 | 0 | 0 | 0 |
| Zinc white | 8 | 8 | 8 | 8 | 8 | 8 |
| Epoxy resin*[2] | 0 | 0 | 0 | 1 | 3 | 1 |
| Vulcanization accelerator*[3] | 0.5 | 0.5 | 0.5 | 0.5 | 0.5 | 0.5 |
| Sulfur | 5 | 5 | 5 | 5 | 5 | 5 |
| Modulus of elasticity at 50% elongation (kg/cm$^2$) | 21 | 15 | 33 | 22 | 23 | 33 |

(Note)
*[1]810NA, trade name, made by Ohuchi Shinko Kagaku K.K.
*[2]Epikote 152, trade name, made by Shell Chemical K.K.
*[3]Noccelar MSA, trade name, made by Ohuchi Shinko Kagaku K.K.

Four test tires each having the tire construction shown in FIGS. 7 and 8 were prepared by applying the rubber composition shown in Table 3 to a combination of coating rubber and auxiliary rubber layer as shown in the following Table 4.

Cornering stability, ride comfortability, durability and rolling resistance were evaluated with respect to these test tires by the following test methods to obtain results as shown in Table 4.

The cornering stability was evaluated according to a method of ASTM F516-77.

Ride comfortability was evaluated by a maximum varying value of axial force of the test tire when the tire was run on an indoor drum of 2 m in outer diameter provided at its outer surface with a protrusion of 12 mm in height and 25 mm in width at a predetermined speed under a given load.

Rolling resistance was evaluated from an inertia moment measured at a given deceleration speed after the test tire was trained on an indoor drum of about 1.7 m in outer diameter under a given load and run at a predetermined constant speed and then the movement of the drum was stopped.

Cornering stability, ride comfortability and rolling resistance were represented by an index on the basis that the tire of Run No. 24 was 100, respectively. The larger the index value, the better the property.

The durability was evaluated by a degree of damage at both end portions of the belt after the test tire was run on an indoor drum at a high speed under a heavy load over 20,000 km, wherein the word "very excellent" was not damage, the word "excellent" substantially no damage and the word "good" slight damage. In the tire of Run No. 24, the crack of 2–4 mm in length was observed at some positions in the circumferential direction of the tire.

TABLE 4

| | Run No. | | | |
|---|---|---|---|---|
| | 24 | 25 | 26 | 27 |
| Rubber composition for coating rubber | C | A | A | B |
| Rubber composition for auxiliary rubber layer | G | E | F | E |
| Thickness of auxiliary rubber layer (mm) | 1.5 | 1.5 | 1.5 | 1.5 |

TABLE 4-continued

| | Run No. | | | |
|---|---|---|---|---|
| | 24 | 25 | 26 | 27 |
| Cornering stability | | | | |
| small slip angle | 100 | 90 | 90 | 85 |
| large slip angle | 100 | 110 | 110 | 110 |
| Ride comfortability | 100 | 115 | 115 | 120 |
| Durability | good | excellent | very excellent | excellent |
| Rolling resistance | 100 | 115 | 112 | 119 |

As seen from the results of Table 4, the cornering stability, ride comfortability and rolling resistance ar largely enhanced without completely or substantially causing the damage of the belt in the tires of Run Nos. 25-27 as compared with the tire of Run No. 24.

As mentioned above, when the metal cord according to the invention is used as a reinforcement for rubber articles, the coating rubber throughly penetrates into the cord in the longitudinal and transverse directions thereof, so that the diffusion of rust on the surface of the metal cord due to the penetration of water through damaged portion can be prevented. Therefore, the cord breaking and separation failure due to the degradation of adhesive force between cord and rubber based on the corrosion of metal cord are considerably controlled to largely improve the service life of the rubber article using the metal cord according to the invention. That is, the metal cords according to the invention can widely be used as a reinforcement in industrial rubber articles such a pneumatic tire, belt conveyor, rubber crawler, hose and so on.

Further, when the metal cord according to the invention is used as a reinforcement in a belt of a pneumatic tire, if the inclination angle of the metal cord embedded in the coating rubber, the shortest vertical distance (L) between most adjacent filaments in the opposite metal cords between adjoining belt layers and the ratio of belt width (B) to tread ground contact width (H) are set within specified ranges, the resistance to cord breaking and the resistance to belt end separation in the belt are considerably improved without degrading the cornering power and rolling resistance. Moreover, when the auxiliary rubber layer is arranged on each end portion of the belt, the local deformation and buckling fatigue of the metal cord in the belt can largely be reduced without damaging the metal cord, and also the cornering stability, ride comfortability and rolling resistance can considerably be improved.

What is claimed is:

1. A metal cord constructed by twisting three metal filaments having the same filament diameter (d) in the same direction, said cord satisfying $3.0d \geq Lmax \geq 1.05d$, $Lmin \geq 1.0d$ and $3.0 \geq Lmax/Lmin \geq 1.05$, wherein Lmax is a center distance between the longest separated metal filaments and Lmin is a center distance between the shortest separated metal filaments, and said cord containing a region having $Lmax \geq 1.5d$ in an amount of not less than 30% per cord length of 50 mm in the longitudinal direction, and said cord having a twisting pitch of 6.5-20 mm and an elongation of 0.2-1.2% under a load of 5.0 kg per cord.

2. The metal cord according to claim 1, wherein said metal cord contains a region having $Lmax \geq 1.5d$ in an amount of not less than 50% per cord length of 50 mm in the longitudinal direction.

3. The metal cord according to claim 1, wherein said metal filament has a forming ratio of 100–300%, preferably 120–200%.

4. The metal cord according to claim 1, wherein said metal filament is a steel filament having a carbon content of 0.75–0.85% by weight and a tensile strength of not less than 280 kg/mm$^2$.

5. The metal cord according to claim 1, wherein one of said metal filaments has a different forming ratio from the other remaining metal filaments.

6. The metal cord according to claim 1, wherein a phase of one of said metal filaments is shifted from those of the other remaining metal filaments.

7. A pneumatic tire comprising a carcass ply of substantially radial structure and a belt superimposed about a crown portion of the carcass ply and composed of plural metal cord layers each containing metal cords therein; said metal cord constructed by twisting three metal filaments having the same filament diameter (d) in the same direction, said cord satisfying $3.0d \geq Lmax \geq 1.05d$, $Lmin \geq 1.0d$ and $3.0 \geq Lmax/Lmin \geq 1.05$, wherein Lmax is a center distance between the longest separated metal filaments and Lmin is a center distance between the shortest separate metal filaments, and said metal cord containing a region having $Lmax \geq 1.5d$ in an amount of not less than 30% per cord length of 50 mm in the longitudinal direction, and said metal cord having a twisting pitch of 6.5–20 mm and an elongation of 0.2–1.2% under a load of 5.0 kg per cord; said metal cords being arranged at an inclination angle of 17°–25° with respect to the circumferential direction of the tire in such a manner that a shortest vertical distance (L) between the most adjacent metal filaments in the opposed metal cords between the adjoining metal cord layers is within a range of 0.5–1.3 mm; and said tire having a ratio of belt width (B) to ground contact width of tread (H) of not more than 1.2.

8. The pneumatic tire according to claim 7, wherein said metal cord contains a region having $Lmax \geq 1.5d$ in an amount of not less than 50% per cord length of 50 mm in the longitudinal direction.

9. The pneumatic tire according to claim 7, wherein said metal filament has a forming ratio of 100–300%, preferably 120–200%.

10. The pneumatic tire according to claim 7, wherein said metal filament is a steel filament having a carbon content of 0.75–0.85% by weight and a tensile strength of not less than 280 kg/mm$^2$.

11. The pneumatic tire according to claim 7, wherein said metal cord layer is comprised by embedding said metal cords in a coating rubber having a modulus of elasticity of 10–30 kg/cm$^2$ under 50% elongation after vulcanization.

12. The pneumatic tire according to claim 7, wherein said belt composed of said metal cord layer is covered at its end portion with an auxiliary rubber layer composed of a rubber composition containing 1–5 parts by weight of an epoxy resin incompatible with rubber based on 100 parts by weight of rubber component.

13. The pneumatic tire according to claim 7, wherein said auxiliary rubber layer has a thickness of 0.5–2 mm.

14. The pneumatic tire according to claim 7, wherein said epoxy resin has an epoxy equivalent of 100–200.

15. The pneumatic tire according to claim 7, wherein said rubber composition has a modulus of elasticity of 10–30 kg/cm$^2$ under 50% elongation after vulcanization.

16. The pneumatic tire according to claim 7, wherein one of said metal filaments has a different forming ratio from the other remaining metal filaments.

17. The pneumatic tire according to claim 7, wherein a phase of one of said metal filaments is shifted from those of the other remaining metal filaments.

* * * * *